(12) United States Patent
Lin et al.

(10) Patent No.: US 8,838,572 B2
(45) Date of Patent: Sep. 16, 2014

(54) EXPERIENCE GRAPH

(75) Inventors: Andrew C. Lin, San Francisco, CA (US); Eric I. Feng, Menlo Park, CA (US); Eugene C. Wei, San Francisco, CA (US)

(73) Assignee: Airtime Media, Inc., San Francisco, CA (US)

( * ) Notice: Subject to any disclaimer, the term of this patent is extended or adjusted under 35 U.S.C. 154(b) by 0 days.

(21) Appl. No.: 13/614,484

(22) Filed: Sep. 13, 2012

(65) Prior Publication Data

US 2013/0124497 A1    May 16, 2013

Related U.S. Application Data

(60) Provisional application No. 61/534,164, filed on Sep. 13, 2011.

(51) Int. Cl.
*G06F 7/00* (2006.01)
*G06F 17/30* (2006.01)

(52) U.S. Cl.
CPC .... *G06F 17/30958* (2013.01); *G06F 17/30598* (2013.01); *G06F 17/30864* (2013.01)
USPC ........................................................ 707/709

(58) Field of Classification Search
None
See application file for complete search history.

(56) References Cited

U.S. PATENT DOCUMENTS

| | | | |
|---|---|---|---|
| 8,396,876 B2 * | 3/2013 | Kennedy et al. | 707/748 |
| 2008/0071796 A1 * | 3/2008 | Ghuneim et al. | 707/10 |
| 2008/0133581 A1 * | 6/2008 | MacVarish | 707/102 |
| 2009/0265631 A1 * | 10/2009 | Sigurbjornsson et al. | 715/716 |
| 2010/0121849 A1 * | 5/2010 | Goeldi | 707/736 |
| 2011/0106589 A1 * | 5/2011 | Blomberg et al. | 705/7.39 |
| 2011/0125765 A1 * | 5/2011 | Tuli | 707/751 |
| 2011/0145064 A1 * | 6/2011 | Anderson et al. | 705/14.53 |
| 2011/0184886 A1 * | 7/2011 | Shoham | 705/400 |
| 2011/0202968 A1 * | 8/2011 | Nurmi | 726/1 |
| 2012/0036200 A1 * | 2/2012 | Cole et al. | 709/206 |
| 2012/0137367 A1 * | 5/2012 | Dupont et al. | 726/25 |
| 2012/0150970 A1 * | 6/2012 | Peterson et al. | 709/206 |
| 2012/0173985 A1 * | 7/2012 | Peppel | 715/730 |
| 2012/0210247 A1 * | 8/2012 | Khouri et al. | 715/751 |
| 2012/0290950 A1 * | 11/2012 | Rapaport et al. | 715/753 |

OTHER PUBLICATIONS

Singh, Vic. "Building the Experience Graph"—Oct. 19, 2011. http://tracksmedia.wordpress.com/category/experience-graph/.*

* cited by examiner

*Primary Examiner* — Robert Beausoliel, Jr.
*Assistant Examiner* — Nicholas Allen
(74) *Attorney, Agent, or Firm* — Perkins Coie LLP

(57) ABSTRACT

Method and system for organizing and sharing content through experience are described. In one embodiment, content may be organized and shared among users through a specific experience. A method for sharing content in a network may include: collecting contents related to a specific experience from a specific user; generating an experience graph of the specific experience; enabling the specific user to invite other users to join the experience graph; and enabling each user inside the experience graph to share new content into the experience graph.

28 Claims, 13 Drawing Sheets

Allowing people to find content by the experience graphs more naturally to how people form memories

Autobiographical memory usually has 3 levels

- Life periods - e.g. childhood, high school, college, job, living in San Francisco
- Events - e.g. high school graduation, my first date, climbing Mount Kilimanjaro
- Event Details - e.g. summiting at Mount Kilimanjaro with my best friend

*FIG. 7*

EXPERIENCE GRAPH

CROSS-REFERENCE TO RELATED APPLICATIONS

This application claims the benefit of priority under 35 U.S.C. 119(e) to U.S. Provisional Patent Application Ser. No. 61/534,164 entitled "EXPERIENCE GRAPH", which was filed on Sep. 13, 2011, the contents of which are expressly incorporated by reference herein.

FIELD OF THE INVENTION

At least one embodiment of the present disclosure pertains to facilitating content sharing over a web-based network, and more particularly, to content sharing based on user experience.

BACKGROUND

The explosion of social networking has led to extensive sharing of information including such items as broadcast streams, videos, photos, soundtracks, drawings, blogs, links, schedules, or any other content created by individuals. However, current methods of sharing information are limited to items recommended or identified by individuals sharing the information. Further, finding all the content related to an experience can be very difficult. Content from the experience may be fragmented across the web in each participant's account at a variety of services that participants may use, from social networks to photo hosting sites to personal publishing platforms like weblog or microblog sites.

In consequence, the present inventors have recognized that there is value and a need in providing content sharing methods and systems for facilitating experience-related content organization and sharing, in addition to more natural group formation.

BRIEF DESCRIPTION OF THE DRAWINGS

One or more embodiments of the present disclosure are illustrated by way of example and not limitation in the figures of the accompanying drawings, in which like references indicate similar elements.

FIGS. 7-9 illustrate examples of an experience graph according to yet another embodiment(s) of the present disclosure.

DETAILED DESCRIPTION

Figure 1:
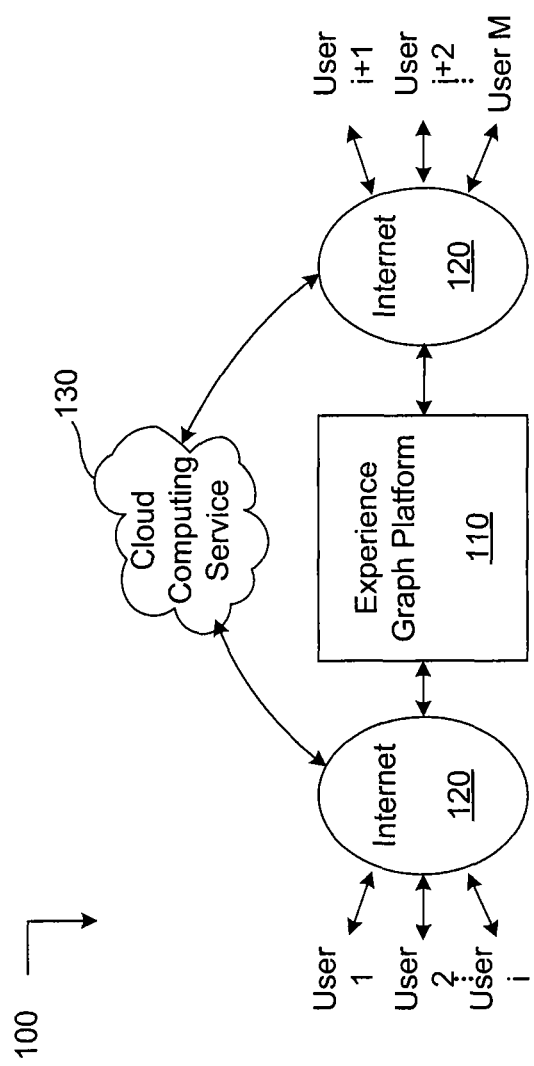
FIG. 1 illustrates a schematic block diagram of a system for facilitating an experience graph over a network according to one embodiment(s) of the present disclosure.

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates a schematic block diagram of a system 100 for facilitating an experience graph over the internet 120, according to one embodiment(s) of the present disclosure. The system 100 may include an experience graph platform 110. The experience graph platform 110 may include one or more server computers that are coupled to the internet 120 and a cloud computing service 130. Each server computer may have one or more IP addresses. In some embodiments, the multiple server computers may be located at the same physical location. In some embodiments, the multiple server computers may be located at multiple physical locations.

The experience graph platform 110 may be configured to enable each new user to set up a new user account and generate a user profile. The user profile may include, by way of example, but not limitation, the personal information, likes/interests, past, current and future experiences, current and/or past physical addresses, etc. In some implementations, the user may be provided an option(s) to connect the user profile to user's existing social media account(s), such as the user's Facebook®, Google®, Tagged®, Quepasa®, Twitter®, Spotify®, MyYearBook®, Pinterest® account, etc.

In some embodiments, an experience is defined as any event or activity that has at least one of a plurality of attributes, which may include who, what, when and where. The event or activity may include one or more people (who), a specific time or a range of times over which it occurred (when), a specific location or range of locations where the experience took place (where), and/or a description of the experience itself (what). For example, a specific experience may be watching a Giants' game with friends, a family vacation, a wedding, dining with friends at a restaurant, a user's career at a specific company, or a person's favorite dish(es) or drink(s) from San Francisco restaurants. In some embodiments, an experience may include all attributes in the plurality of attributes. In some embodiments, an experience may not include all attributes in the plurality of attributes. For example, an experience may be a user's favorite restaurant in the world, which has no defined end date or strict set of locations since the user may add new ones to the list over time. For another example, an experience may be a user's career at a company. While the user is still working for the company, the end date of the user's career there may be indefinite.

Some embodiments may define an experience graph as a structure for users to organize and share content. Inside the experience graph, users may be grouped by one or more experiences they have shared. In some implementations, users may be grouped by a single experience or multiple experiences that they have shared or will share together. In some embodiments, content may be organized and shared among users through shared experience(s) rather than being shared directly between users.

The experience graph platform 110 may be configured to make experience the primary key in organizing content and groups of people. Users associated with an experience may form a closed network or experience graph. Content in the experience graph may be reciprocal. In other words, all contents may flow from and to each user inside the experience graph. In some embodiments, the type of content may include a variety of content types, such as, images from a live broadcast, videos, photos, text notes, webpage links, transactions, recommendations, music, files, etc.

In some embodiments, the experience graph platform 110 may be configured to automatically update a user's profile and/or experiences in the platform 110 by bringing in updates of the user's Facebook® account, and/or Google® account, etc. In some embodiments, the experience graph platform 110 may be configured to automatically update a shared experience by downloading published contents related to the shared experience from a variety of services that users inside the shared experience may use. The variety of services may include live broadcast sites, social networks, photo hosting sites, personal publishing platforms (i.e., weblogs, microblog sites, etc.), etc.

In some embodiments, each user inside an experience graph may add additional user(s) into the experience graph. Any user inside the experience graph may see all contents contributed to the experience graph. In some implementations, to share content to other users of an experience, a specific user may have to first share the content into the experience, resulting in the content flowing to all users of the experience graph. In some embodiments, sharing content(s) to an experience graph may be accomplished simultaneously with receiving content(s) from the experience graph. There are no separate states for sharing or receiving content inside an experience graph.

Each user can be a member of two or more experience graphs, each of which may be a closed, reciprocal, and federated graph. In some embodiments, experiences can be grouped either manually by users or automatically according to common attributes, such as location, time, and/or descriptions, etc. When two or more experiences are grouped together, their corresponding graphs may be combined as well. Users in the combined graphs may view the content from any of the two or more experiences.

In some embodiments, users may navigate content in the experience graph by traversing any of the plurality of attributes of each experience, such as location, time, people, and the description, etc. For example, a user may start by finding content related to a specific description, such as San Francisco Giants baseball games (what). From the search results, the user may then choose to navigate to content related to a Giants game on a particular date, such as on Jun. 13, 2012 when the Giants had their first perfect game in their franchise history (when). While exploring that content, the user may then choose to navigate to find content that occurred near that experience, perhaps inside AT&T Park during the game or post-game celebrations (where). And then the user may choose to refine the search to only content from other users in the user's social graph (who). In some implementations, navigating content in the experience graph may be supported only by four key attributes—location, time, people, and the description.

Some embodiments may provide an experience graph for a multi-dimensional browse and a search tree for users to traverse content related to experience(s) of the experience graph. In some embodiments, a specific user may browse other experiences of another user with whom the specific user has at least an experience in common on the experience graph, if the browsing is enabled and allowed by another user's privacy settings.

In some embodiments, an experience graph may be implemented by using a database to store each primitive of the experience. In the database, each primitive may be assigned a unique identification number. Contents associated with the experience may be stored in an associated storage system and/or device. Each piece of content may reference its corresponding identification number so that all contents can be located or queried for based on the experience. In some embodiments, the database may be a cloud-based database with its content stored in the cloud.

Various embodiments may provide other identifiers to uniquely identify attributes, such as users, places, time-based events, etc. In some implementations, the other identifiers may be used to facilitate browsing an experience graph through a dimension. For example, the other identifiers may be used to find other experiences "nearby" (i.e., in time, or other relevant metrics). The other experiences and the current experience may have one or more shared factors, which include, for example, shared by a specific user of the current experience, at the same place as the current experience and/or in its vicinity, and/or near in time to the current experience.

In some embodiments, experience primitives may be manually created and updated by users within the experience graph through user input means, such as a keyboard, touch screen or other touch input device, a microphone, etc. In some embodiments, experience primitives may be automatically created or updated through data mining crawlers. The data mining crawlers may examine a specific user's data from other sources and extract the necessary attributes (i.e., who, what, when, and where attributes) to populate the experience database. In some implementations, the other sources may include, but is not limited to, video broadcast services, third party video and/or photo sharing services, check-in services, event planning services, calendaring services, and other services that store experience data. In some embodiments, the data mining crawlers may be configured to collect images from a live broadcast relevant to the experience.

Figure 2:
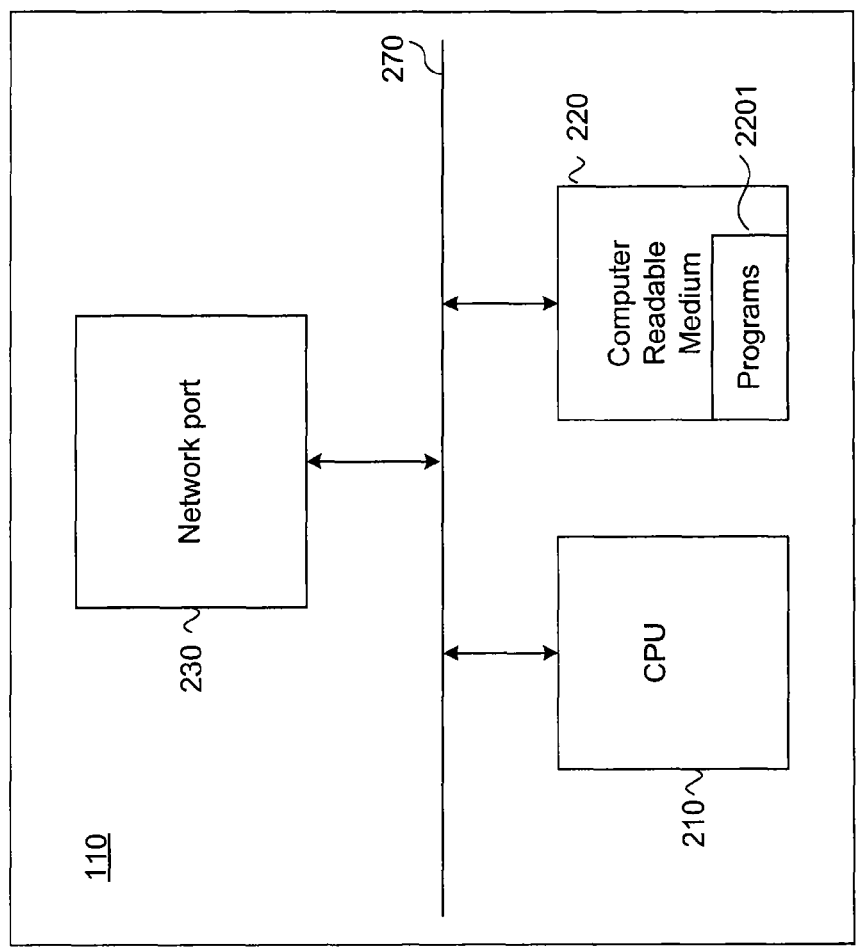
FIG. 2 illustrates a schematic block diagram of a platform for facilitating an experience graph over a network according to another embodiment(s) of the present disclosure.

FIG. 2 illustrates a schematic block diagram of a platform for facilitating experience graph over a network according to another embodiment(s) of the present disclosure. The platform 110 may include, but is not limited to, one or more server computers. Each server computer may include at least a processor or a central processor unit ("CPU") 210, one or more network ports 230, and one or more computer-readable mediums 220, all interconnected via one or more internal buses 270. Each server computer preferably may include an operating system, such as, but is not limited to, Windows™, Linux™, or Unix™. The computer-readable medium 220 may be any medium device that is configured to store data, such as a hard drive, RAM, ROM, flash memory, electrically erasable program read-only memory (EEPROM), CD-ROM, digital versatile disks (DVD), or the like.

Programs 2201 may be stored on one or more computer-readable mediums 220. The programs 2201, when executed by the processor(s) 210, may cause the processor(s) 210 to perform certain operations. In some implementations, the operations may include, but is not limited to, collecting contents related to a specific experience from a specific user, generating an experience graph of the specific experience, enabling the specific user to invite other users to join the experience graph, and enabling each user inside the experience graph to share new content into the experience graph. In some embodiments, the operations may further include providing options for the specific user to navigate content of the experience graph via a plurality of attributes related the specific experience.

In some embodiments, the operations may comprise of combining the experience graph with other experience graph(s) by grouping experiences, in which experiences may be grouped manually by users inside the experience graphs or automatically based on common attributes like location, time, and/or interest, etc.

Figure 3:
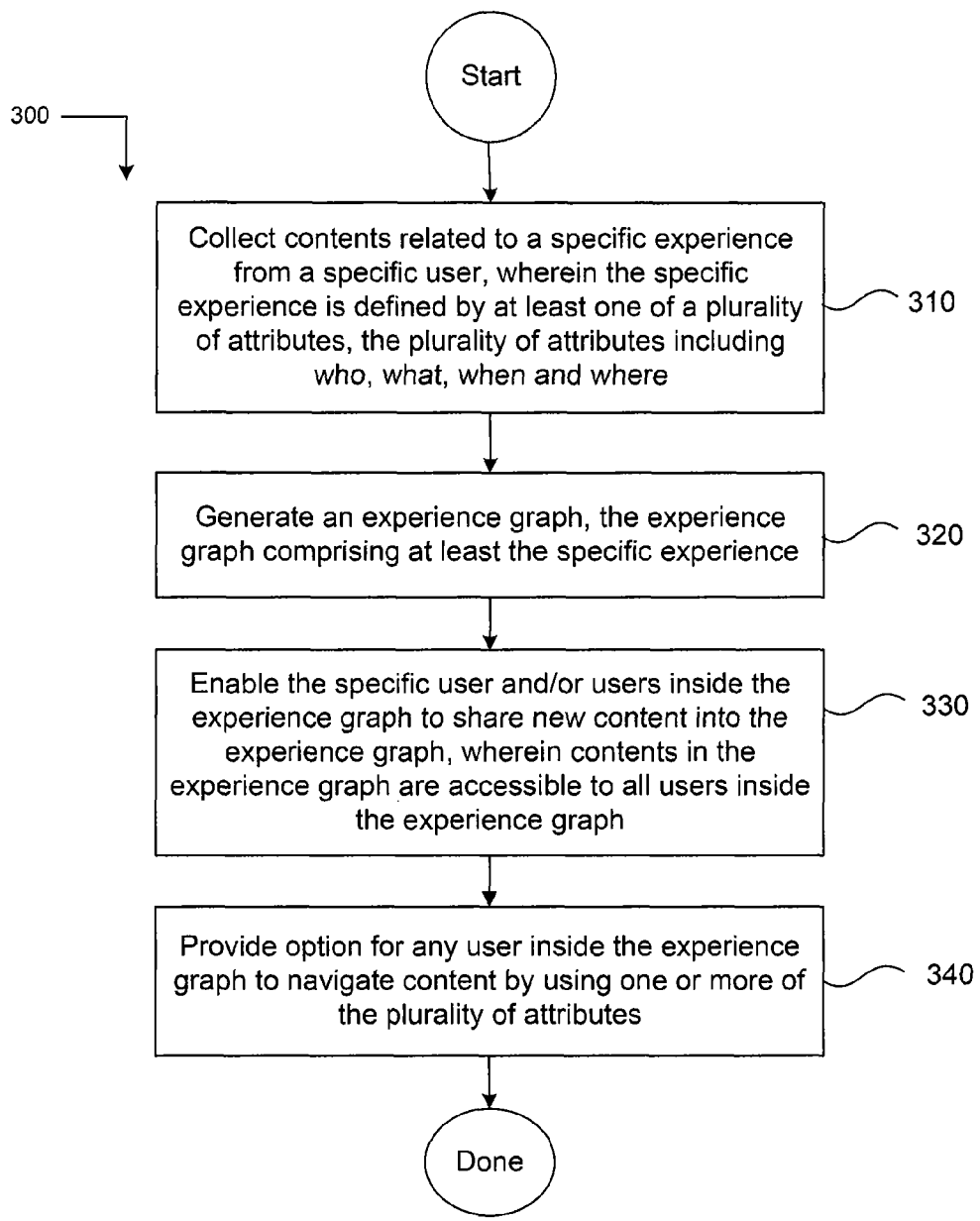
FIG. 3 illustrates a flow diagram of a process for providing an experience graph for a specific user according to yet another embodiment(s) of the present disclosure.

FIG. 3 illustrates a flow diagram of a process for providing experience graph for a specific user according to yet another embodiment(s) of the present disclosure. At step 310, contents related to a specific experience, including, but is not limited to, images from a live broadcast, videos, photos, text notes, webpage links, transactions, recommendations, music, files, etc., may be collected from a specific user. In some embodiments, the content may be automatically collected from online services that the specific user has used and/or is using. The online services may include live broadcast sites, social networks, photo hosting sites, personal publishing platforms (i.e., weblogs or microblog sites), etc. In some embodiments, the specific experience is defined by at least one of the plurality of attributes, which includes who, what, when, and where.

At step 320, an experience graph may be generated, the experience graph comprising at least of the specific experience. Each user inside the experience graph may be provided an option to share new content into the experience graph, in which contents inside the experience graph are accessible to all users inside the experience graph, at step 330. In some embodiments, new contents can be shared from a sharing user to other users inside the experience graph only by first sharing the new contents into the experience graph. Any user inside the experience graph may be provided an option to navigate content by using one or more of the plurality of attributes, step 340.

Figure 4:
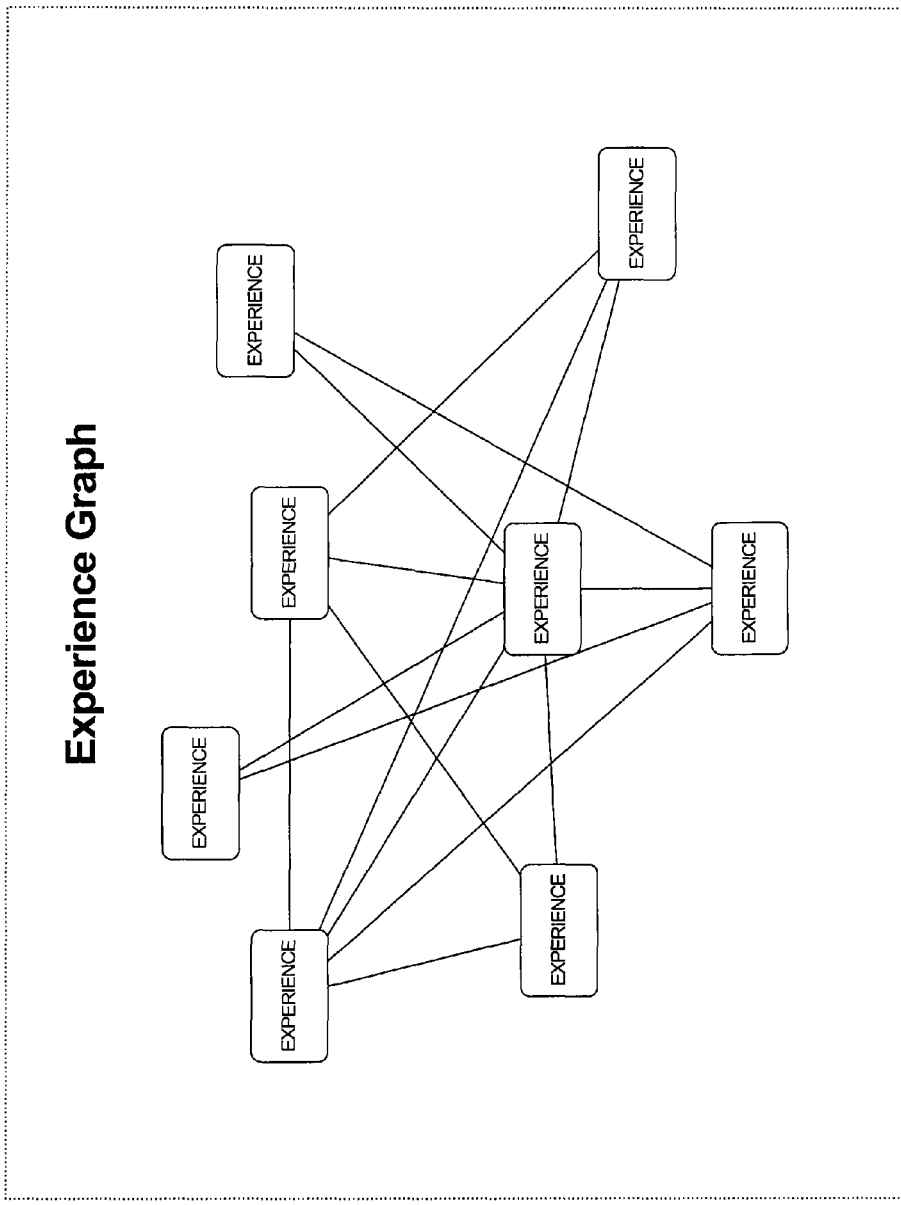
FIG. 4 illustrates an example of an experience graph including a plurality of experiences, according to yet another embodiment(s) of the present disclosure.

FIG. 4 illustrates an example of experience graph including a plurality of experiences, according to yet another embodiment(s) of the present disclosure. In some embodiments, new experience(s) may be added to an experience graph manually by users in the experience graph according to common attributes, such as time, description, location, etc. In some embodiments, the experience graph may be automatically updated and expanded through data mining crawlers. The data mining crawlers may examine data from other sources that a user inside the experience graph may use or have used and extract new experience(s) and/or new contents to populate the experience graph. In some embodiments, experience graphs may be combined by grouping experiences with at least one common attribute.

Figure 5:
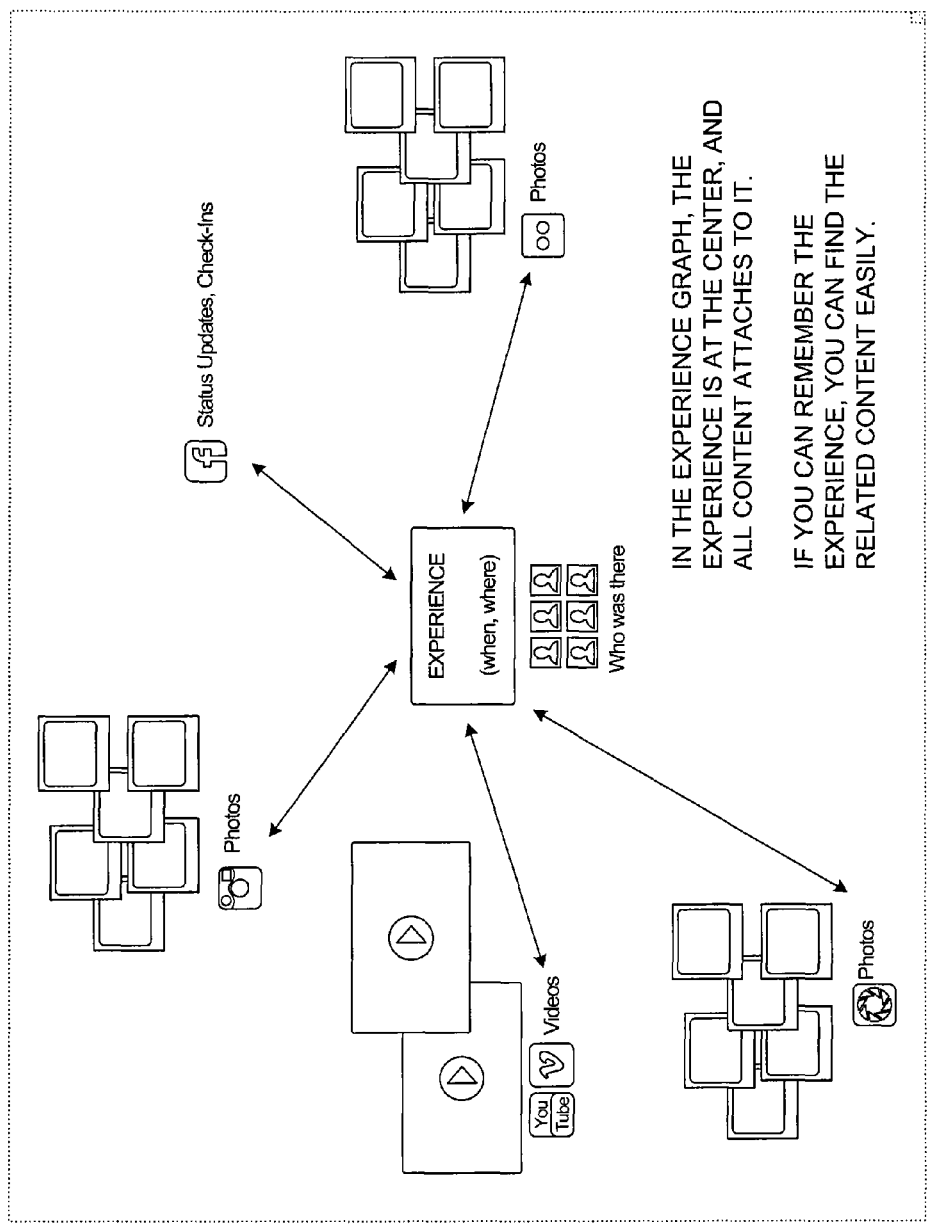
FIGS. 5-6 illustrate examples of an experience graph with associated content, according to yet another embodiment(s) of the present disclosure.
Figure 6:
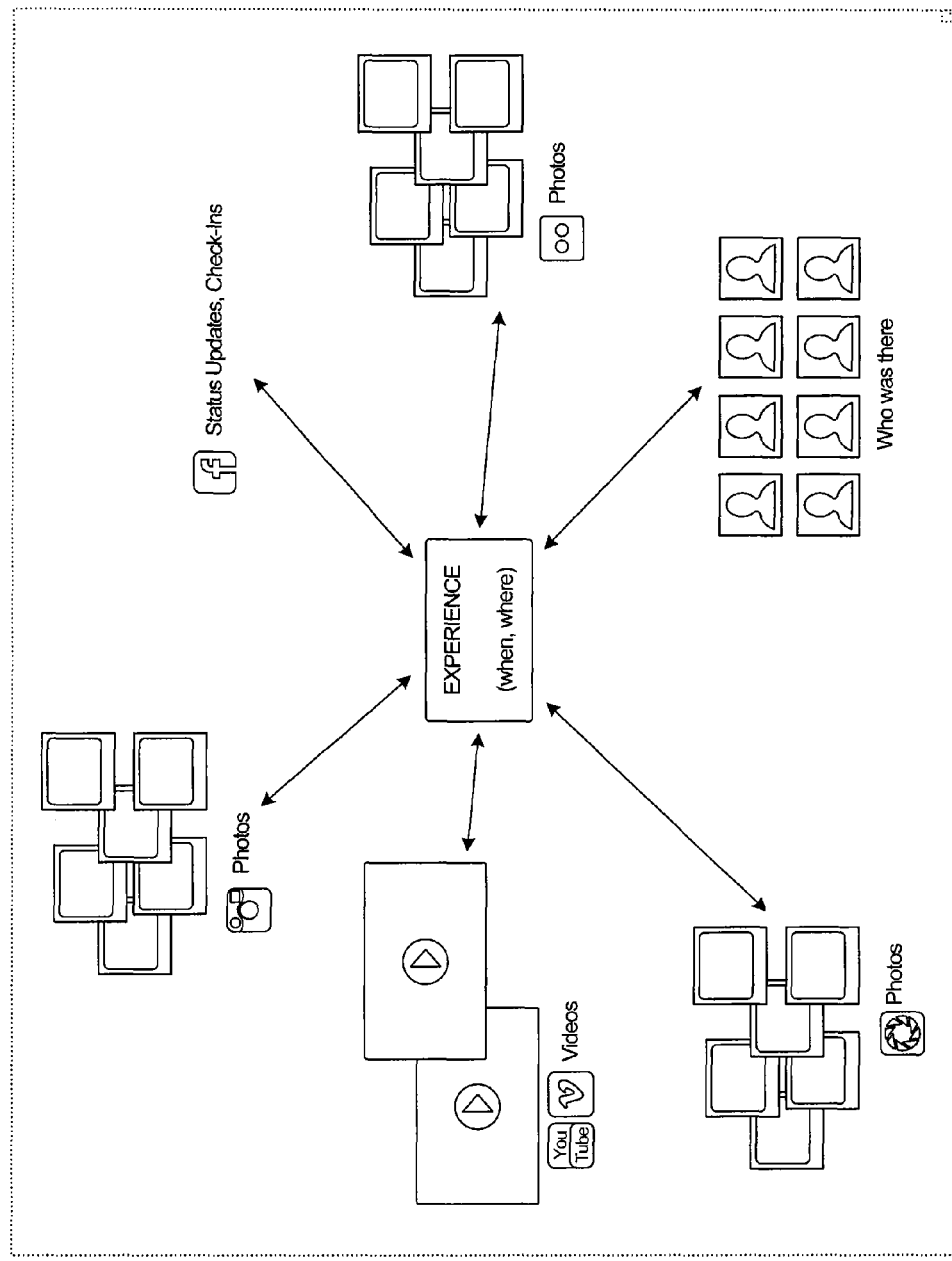

FIGS. 5-6 illustrate examples of an experience graph with associated contents, according to yet another embodiment(s) of the present disclosure. In an experience graph, the experience is at the center while all contents may be attached to and categorized around the experience. The experience may be a central node in the experience graph. The experience graph may be configured to link the experience with all its contents. When new content is added, the experience graph may be configured to automatically update the links between the experience and all its contents. All users within the experience graph may access the new content through the experience graph. In some implementations, the contents may include images from a live broadcast, videos, photos, status updates at a social networking service (i.e, Facebook®), check-ins, text notes, webpage links, transactions, recommendations, music, files, etc. Since contents are categorized around the experience, a specific content related to the experience may be easily located through the experience. For example, a group of friends went to Florida for a Christmas vacation 10 years ago. Each of the group of friends may be found easily through the Florida-trip experience.

Figure 8:
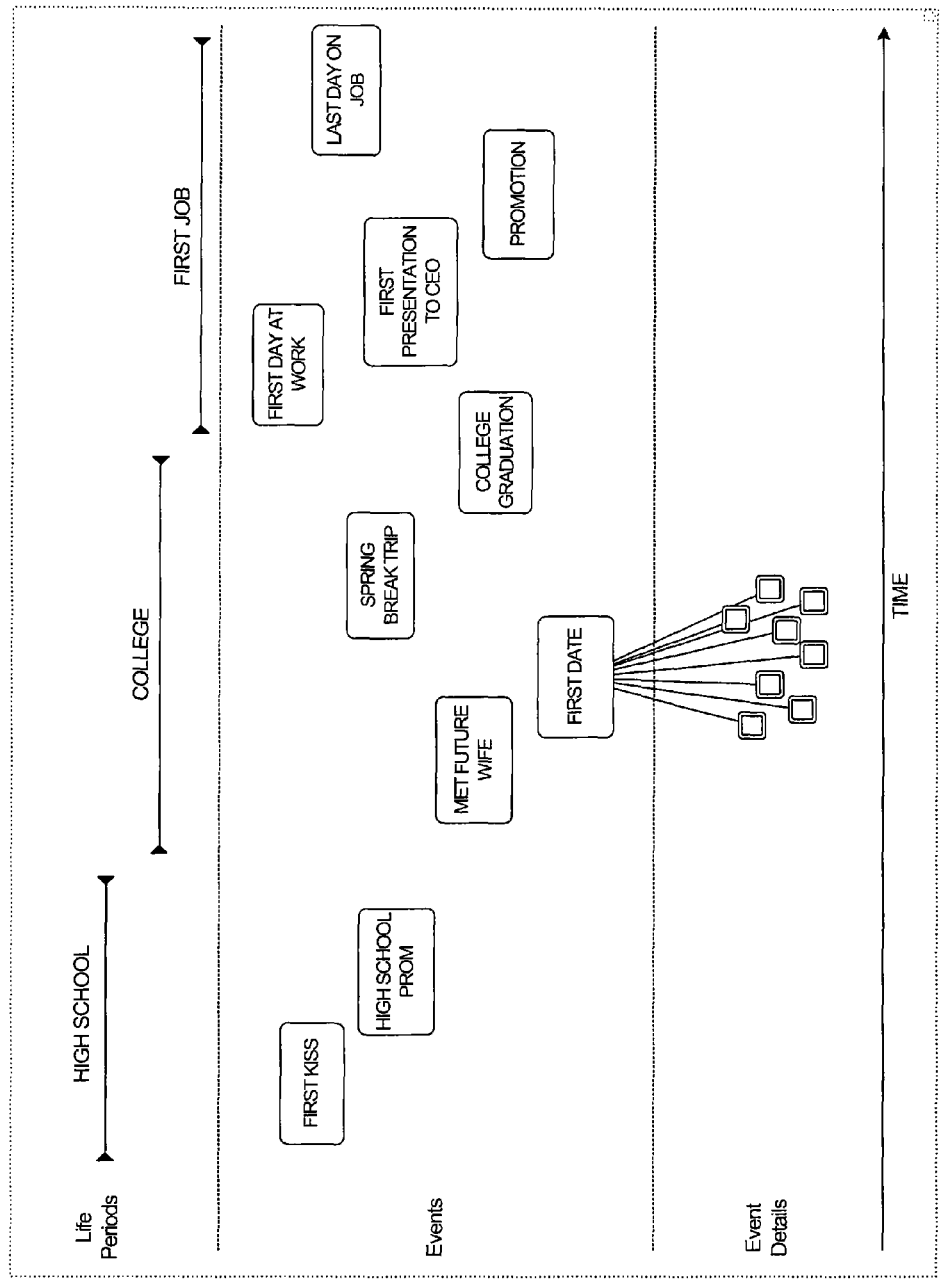
Figure 9:
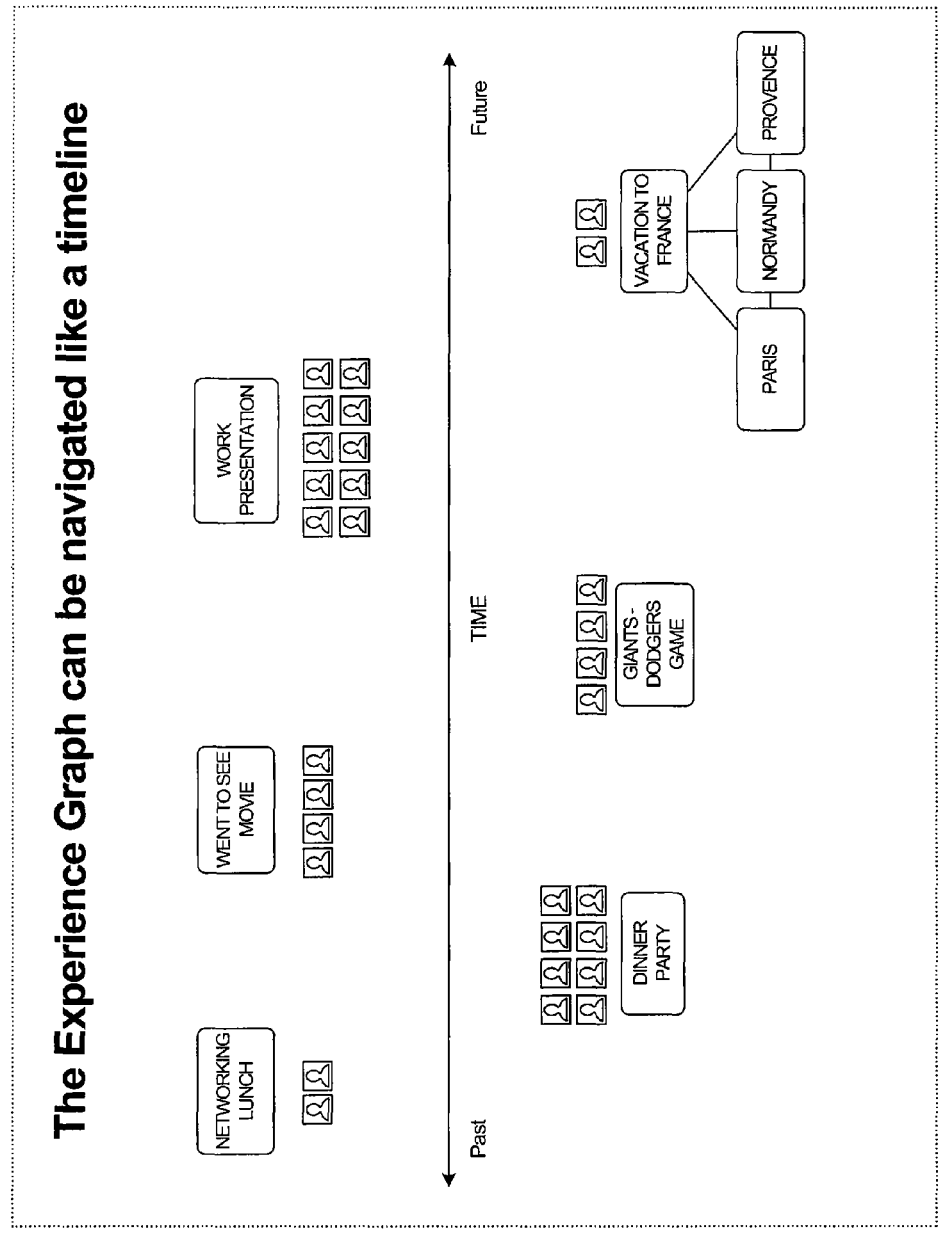

FIGS. 7-9 illustrate examples of experience graph according to yet another embodiment(s) of the present disclosure. In some embodiments, experience graphs may be generated and organized according to how people naturally form memories. In some embodiments, experience graphs may be grouped into three different levels. At level 1, the experience graphs may be grouped according to a specific user's life periods, for example, but is not limited to, childhood, high school, college, first job, living in San Francisco, etc. At level 2, the experience graphs may be grouped according to events, such as high school graduation, first kiss, high school prom, first date, spring break trip, college graduation, first day at work, first presentation to CEO, promotion, last day on job, climbing Mount Kilimanjaro, etc. At level 3, the experience graph may be grouped by event details, such as summiting at Mount Kilimanjaro with best friend, etc. In some embodiments, the experience graph may be navigated like a timeline. For example, past experiences may include events, such as, networking lunch, dinner party, went to see a movie, Giants-Dodgers game, etc. Current experiences may include work presentation, etc. Future experiences may include a planned vacation to France, including trips to Paris, Normandy, Provence, etc.

Figure 10:
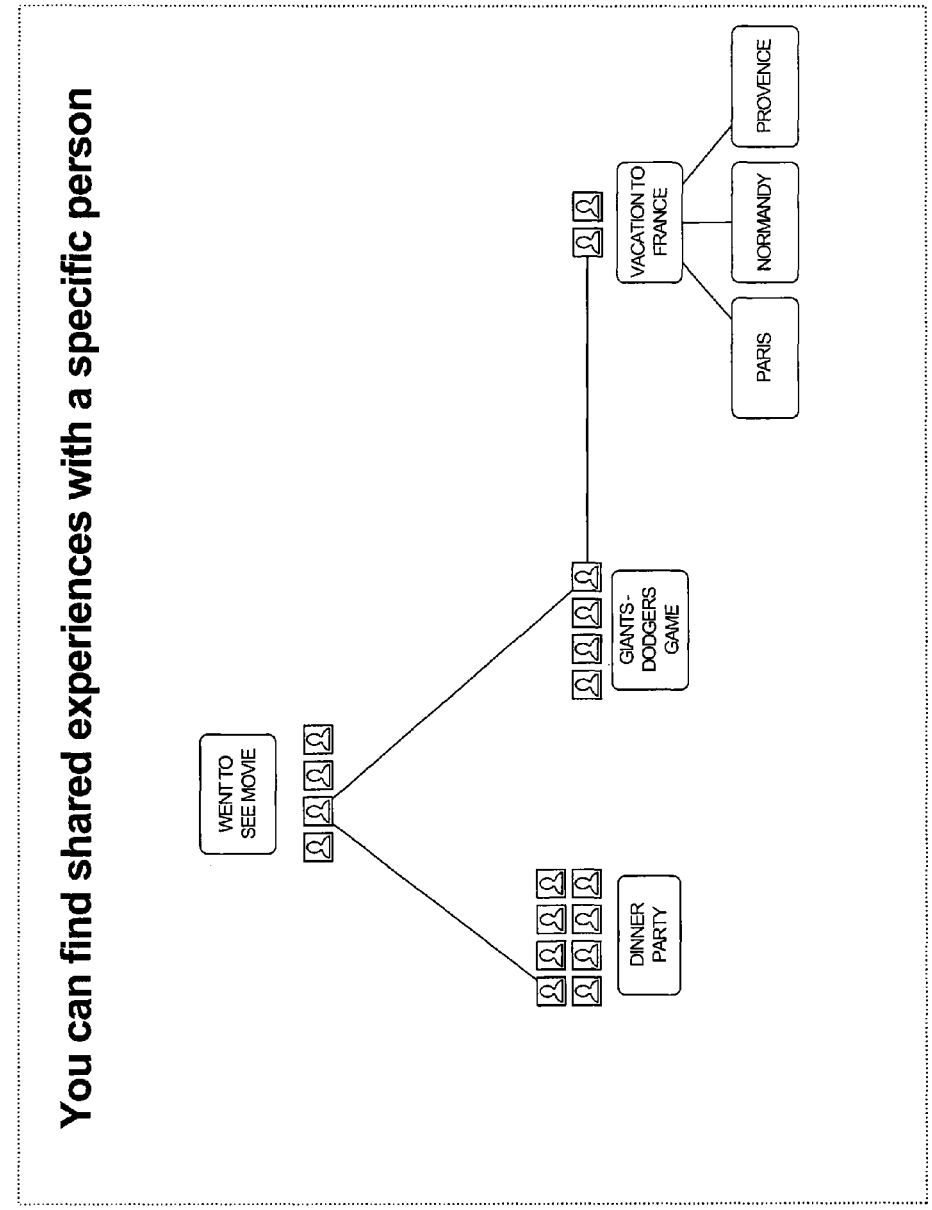
FIGS. 10-11 illustrate examples of search options with an experience graph, according to yet another embodiment(s) of the present disclosure.
Figure 11:
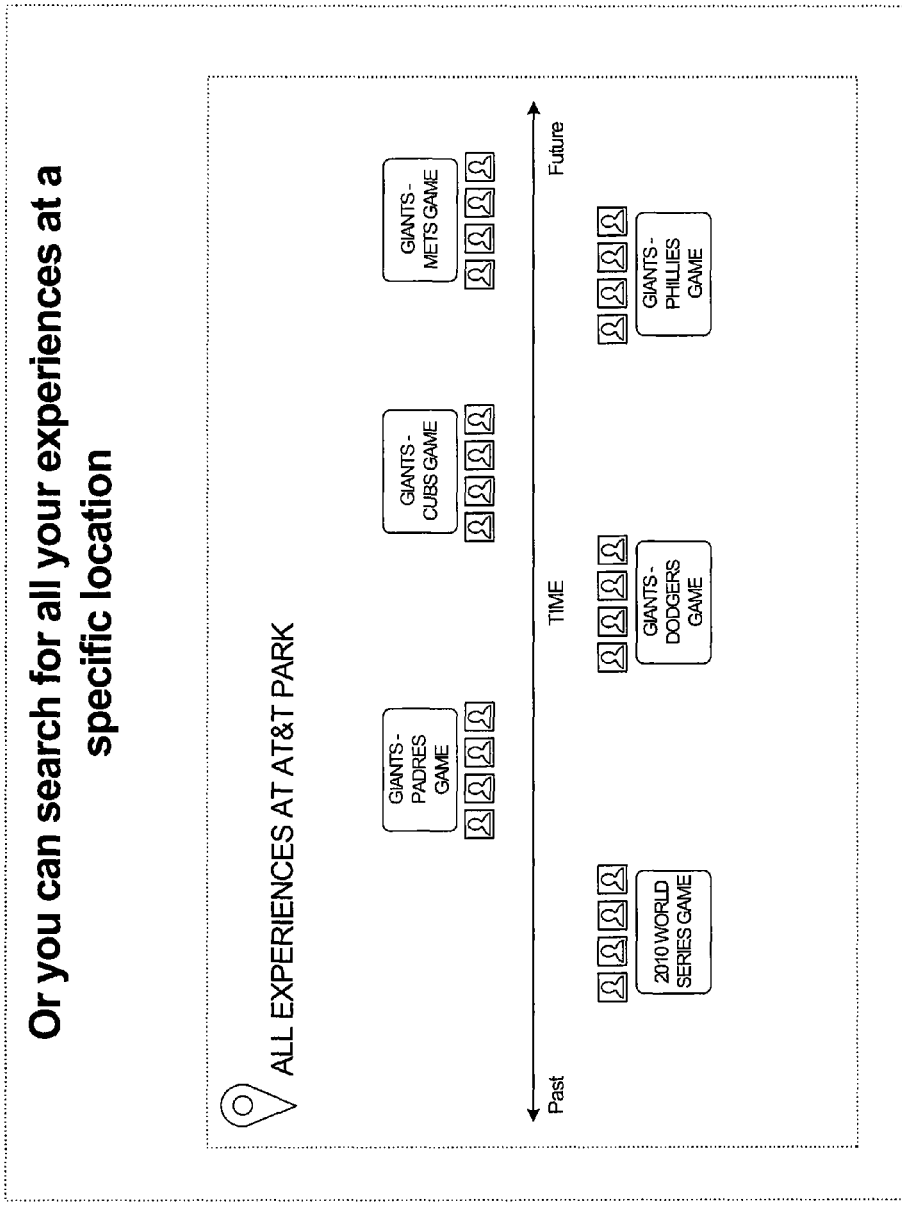

FIGS. 10-11 illustrate examples of a search option with an experience graph, according to yet another embodiment(s) of the present disclosure. In some embodiments, a user may search content in the experience graph based on any of a plurality of attributes. The plurality of attributes may include experience primitives and factors related to the experiences inside the experience graph. In some implementations, the plurality of attributes may include who, what, when, and where. For example, a user may search shared experiences with a specific person by searching the specific person. The shared experiences may include past experiences (i.e., went to see movie, dinner party, etc.), current experience (i.e., Giants-Dodgers game), and future experiences (i.e., vacation to France). For another example, a user may search for all experiences at a specific location by searching the specific location. For example, by searching AT&T Park, the search results may include all of the user's past, current, and future experiences at AT&T parks, which may include, for example, 2010 World Series Game, Giants-Padres game, Giant-Dodgers game, Giants-Phillies game, Giants-Mets game, etc.

Figure 12:
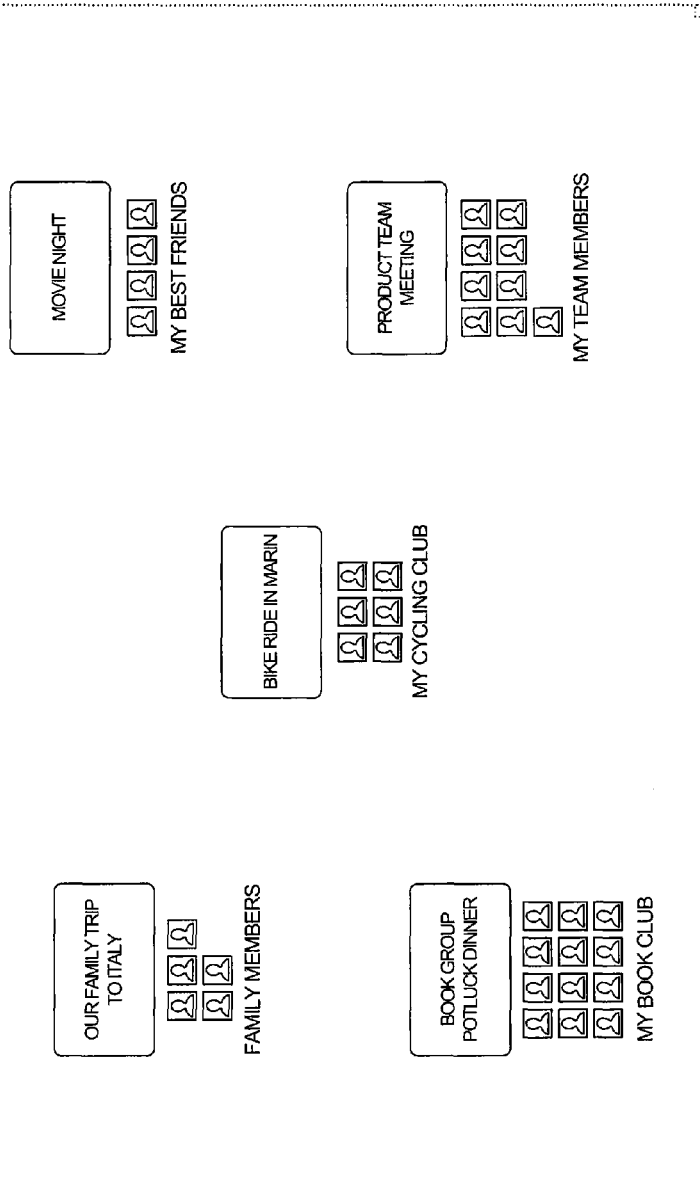
FIG. 12 illustrates an example of contextual groups formed by users, with which a specific user shares one or more experiences, according to yet another embodiment(s) of the present disclosure.

FIG. 12 illustrates an example of contextual groups formed by users, with which a specific user shares one or more experiences, according to yet another embodiment(s) of the present disclosure. In some embodiments, an experience graph may be updated and/or expanded by examining data related to contextual groups of users inside the experience graph. In some implementations, many users may share one or more experiences together. By examining and extracting necessary attributes related to contextual groups, the database of experience graphs may be updated and/or expanded over time.

Figure 13:
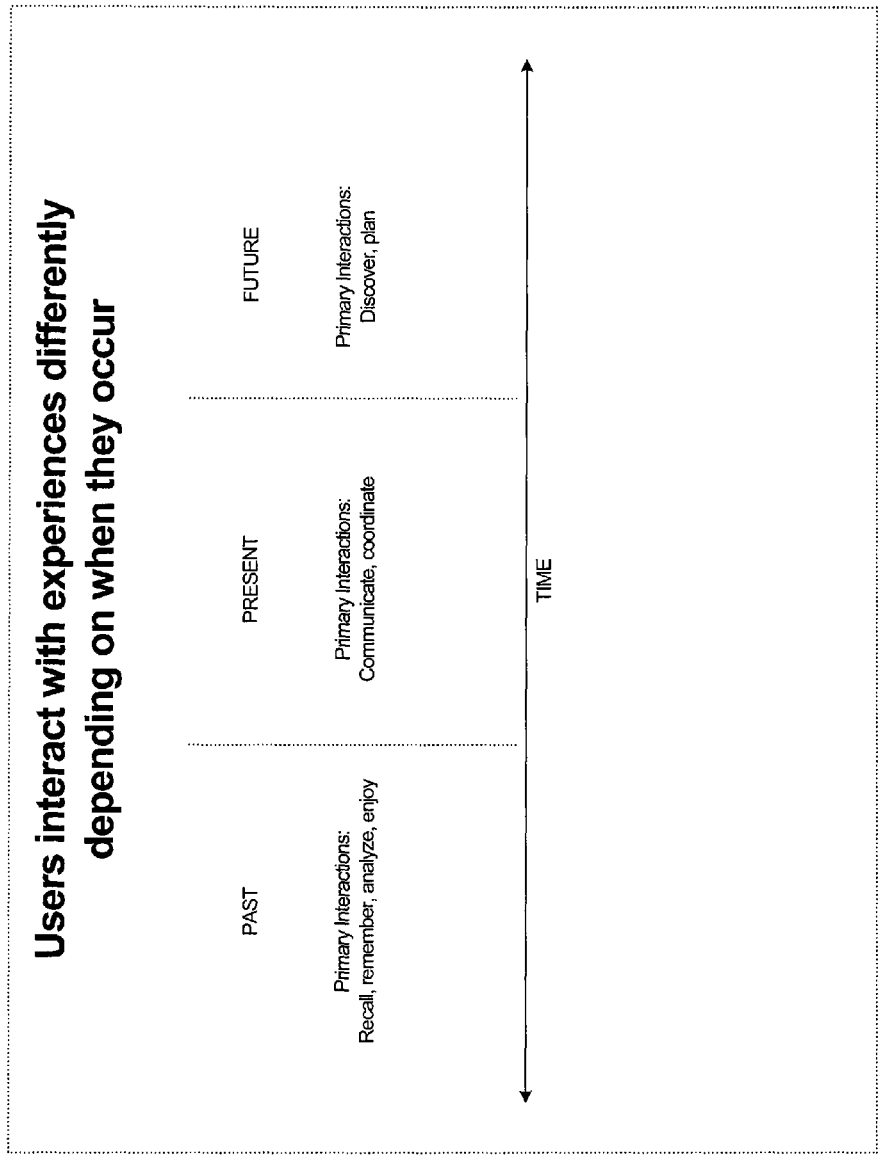
FIG. 13 illustrates an example of an experience graph, according to yet another embodiment(s) of the present disclosure.

FIG. 13 illustrates an example of experience graph, according to yet another embodiment(s) of the present disclosure. In some embodiments, experience graphs may be organized and categorized according to users' primary interactions with past, current, and future experiences. For example, an experience graph on past experiences may be targeted towards users' primary interactions, such as recall, remember, analyze, enjoy, etc. An experience graph on current experiences may be targeted towards users' primary interactions, such as communication, coordination, etc. An experience graph on future experiences may be targeted towards users' primary interactions, such as discovery, planning, etc.

While the computer-readable medium is shown in an embodiment to be a single medium, the term "computer-readable medium" should be taken to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but is not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method of sharing content related to a specific experience within an experience graph in a social network, the specific experience being a central node in the experience graph, the experience graph configured to link the specific experience with each of the corresponding contents, the method comprising:
    collecting the contents related to the specific experience from a specific user, wherein the specific experience is defined by at least one of a plurality of attributes;
    generating the experience graph by combining the specific experience with the contents, the experience graph comprising the specific experience and the contents, wherein the experience graph is traversable by the at least one of the plurality of attributes;
    enabling the specific user to invite one or more additional users to join the experience graph, wherein each user inside the experience graph has access to all contents inside the experience graph;
    organizing the experience graph by grouping the specific experience into at least three categories, the at least three categories include past experience, current experience and planned future experience;
    enabling the specific user to search for all experience at a specific location to generate search results, wherein the search results include at least any of the past experience, the current experience and the planned future experience at the specific location;
    enabling each user to share new content into the experience graph; wherein the links between the specific experience and the corresponding contents are automatically updated; wherein the new content is accessible by all other users inside the experience graph through the experience graph;
    and
    expanding the experience graph over time by automatically examining and extracting necessary attributes related to contextual groups of users inside the experience graph.

2. A computer-implemented method as recited in claim 1, wherein one or more of the plurality of attributes is null in the specific experience.

3. A computer-implemented method as recited in claim 1, wherein the contents are collected from at least one of a plurality of user input means and/or through one or more data mining crawlers, the plurality of user input means including one or more from the group comprising keyboard, touch input device, and a microphone.

4. A computer-implemented method as recited in claim 1, further comprising:
    enabling each user of the experience graph to navigate content in the experience graph by using one or more attributes in the plurality of attributes.

5. A computer-implemented method as recited in claim 4, further comprising:
    enabling each user of the experience graph to browse other experiences of another user, if the browsing is enabled and allowed by another user's privacy settings.

6. A computer-implemented method as recited in claim 1, further comprising:
    updating the experience graph by downloading contents related to the specific experience from a plurality of services used by users inside the experience graph.

7. A computer-implemented method as recited in claim 6, wherein the plurality of services comprises one or more from a group comprising live broadcast sites, social networks, photo hosting sites, and personal publishing platforms.

8. A computer-implemented method as recited in claim 1, wherein the specific experience comprising a plurality of contents, the types of the plurality of contents comprising one or more from a group comprising videos, photos, images from live broadcasts, text notes, webpage links, transactions, recommendations, music, and files.

9. A computer-implemented method as recited in claim 1, further comprising:
    combining the experience graph with one or more other experience graph(s) by grouping the specific experience with experience(s) inside the one or more other experience graph(s), wherein the grouped experiences have at least one common attribute from the plurality of attributes.

10. A computer-implemented method as recited in claim 1, wherein each primitive of the specific experience is stored in a database and assigned with a unique identification number.

11. A computer-implemented method as recited in claim 10, wherein the database is a cloud-based database.

12. A computer-implemented method as recited in claim 11, wherein the primitives of the specific experience is automatically created or updated by one or more data mining crawlers.

13. The computer-implemented method of claim 1, further comprising:
    connecting the experiences graph with a particular user's existing social media account(s), wherein the social media account(s) comprises one or more from a group comprising Facebook®, Google®, Tagged®, Quepasa®, Twitter®, Spotify®, MyYearBook®, and Pinterest® account;
    updating the experience graph by bringing updates from the particular user's connected social media account(s).

14. A system for sharing content related to a specific experience within an experience graph in a social network, the specific experience being a central node in the experience graph, the experience graph configured to link the specific experience with each of the corresponding contents, comprising:
    one or more processors, and
    instructions encoded in one or more computer-readable mediums wherein the instructions when executed in a platform featuring the one or more processors, cause the platform to perform operations comprising:

collecting the contents related to the specific experience from a specific user, wherein the specific experience is defined by at least one of a plurality of attributes;

generating the experience graph by combining the specific experience with the contents, the experience graph comprising the specific experience and the contents, wherein the experience graph is traversable by the at least one of the plurality of attributes;

organizing the experience graph by grouping the specific experience into at least three categories, the at least three categories include past experience, current experience and planned future experience;

enabling the specific user to search for all experience at a specific location to generate search results, wherein the search results includes at least any of the past experience, the current experience and the planned future experience at the specific location;

enabling the specific user to invite one or more additional users to join the experience graph, wherein each user inside the experience graph has access to all contents inside the experience graph;

enabling each user to share new content into the experience graph; wherein the links between the specific experience and the corresponding contents are automatically updated; wherein the new content is accessible by all other users inside the experience graph through the experience graph;

and expanding the experience graph over time by automatically examining and extracting necessary attributes related to contextual groups of users inside the experience graph.

15. A system recited in claim 14, wherein one or more of the plurality of attributes is null in the specific experience.

16. A system recited in claim 14, wherein the contents are collected from at least one of a plurality of user input means and/or through one or more data mining crawlers, the plurality of user input means including one or more from the group comprising keyboard, touch input device, and a microphone.

17. A system recited in claim 14, wherein the operations further comprise:

enabling each user of the experience graph to navigate content in the experience graph by using one or more attributes in the plurality of attributes.

18. A system recited in claim 17, wherein the operations further comprise:

enabling each user of the experience graph to browse other experiences of another user, if the browsing is enabled and allowed by another user's privacy settings.

19. A system recited in claim 14, wherein the operations further comprise:

updating the experience graph by downloading contents related to the specific experience from a plurality of services used by users inside the experience graph.

20. A system recited in claim 19, wherein the plurality of services comprises one or more from a group comprising live broadcast sites, social networks, photo hosting sites, and personal publishing platforms.

21. A system recited in claim 14, wherein the specific experience comprising a plurality of contents, the types of the plurality of contents comprising one or more from a group comprising videos, photos, images from live broadcasts, text notes, webpage links, transactions, recommendations, music, and files.

22. A system recited in claim 14, wherein the operations further comprise:

combining the experience graph with one or more other experience graph(s) by grouping the specific experience with experience(s) inside the one or more other experience graph(s), wherein the grouped experiences have at least one common attribute from the plurality of attributes.

23. A system recited in claim 14, wherein each primitive of the specific experience is stored in a database and is assigned with a unique identification number.

24. A system recited in claim 23, wherein the database is a cloud-based database.

25. A system recited in claim 24, wherein the primitives of the specific experience is automatically created or updated by one or more data mining crawlers.

26. A computer-implemented method of sharing content related to a specific experience within an experience graph in a social network, the specific experience being a central node in the experience graph, the experience graph configured to link the specific experience with each of the corresponding contents, the method comprising:

collecting the contents related to the specific experience from a specific user, wherein the specific experience is defined by at least one of a plurality of attributes, the plurality of attributes including a what attribute, a who attribute, a when attribute, and a where attribute;

generating the experience graph by combining the specific experience with the contents, the experience graph comprising the specific experience and the contents, wherein the experience graph is traversable by the at least one of the plurality of attributes;

organizing the experience graph by grouping the specific experience into at least three categories, the at least three categories include past experience, current experience and planned future experience;

enabling the specific user to search for all experience at a specific location to generate search results, wherein the search results includes at least any of the past experience, the current experience and the planned future experience at the specific location;

enabling each user inside the experience graph to share new content into the experience graph, wherein contents inside the experience graph are accessible to all users inside the experience graph;

enabling each user inside the experience graph to navigate content by using at least one of the plurality of attributes; and expanding the experience graph over time by automatically examining and extracting necessary attributes related to contextual groups of users inside the experience graph.

27. An apparatus for sharing content related to a specific experience within an experience graph in a social network, the specific experience being a central node in the experience graph, the experience graph configured to link the specific experience with each of the corresponding contents, the apparatus comprising:

means for collecting the contents related to the specific experience from a specific user, wherein the specific experience is defined by at least one of a plurality of attributes, the plurality of attributes including a what attribute, a who attribute, a when attribute, and a where attribute;

means for generating the experience graph by combining the specific experience with the contents, the experience graph comprising the specific experience and the contents, wherein the experience graph is traversable by the at least one of the plurality of attributes;

means for organizing the experience graph by grouping the specific experience into at least three categories, the at least three categories include past experience, current experience and planned future experience;

means for enabling the specific user to search for all experience at a specific location to generate search results, wherein the search results includes at least any of the past experience, the current experience and the planned future experience at the specific location;

means for enabling the specific user to invite one or more additional users to join the experience graph, wherein each user inside the experience graph has access to all contents inside the experience graph;

means for enabling each user to share new content into the experience graph; wherein the links between the specific experience and the corresponding contents are automatically updated; wherein the new content is accessible by all other users inside the experience graph through the experience graph; and means for expanding the experience graph over time by automatically examining and extracting necessary attributes related to contextual groups of users inside the experience graph.

28. A computer-implemented method of sharing content related to a specific experience within an experience graph in a social network, the method comprising:

collecting the contents related to the specific experience from a specific user, the specific experience being a central node in the experience graph, the specific experience defined by at least one of a plurality of attributes, the plurality of attributes including a what attribute, a who attribute, a when attribute, and a where attribute, the experience graph configured to link the specific experience with each of the corresponding contents;

generating the experience graph by combining the specific experience with the contents, the experience graph comprising the specific experience and the contents, the experience graph being traversable by the at least one of the plurality of attributes;

organizing the experience graph by grouping the specific experience into at least three categories, the at least three categories include past experience, current experience and planned future experience;

enabling the specific user to search for all experience at a specific location to generate search results, wherein the search results includes at least any of the past experience, the current experience and the planned future experience at the specific location;

enabling the specific user to invite one or more additional users to join the experience graph, wherein each user inside the experience graph has access to all contents inside the experience graph;

enabling each user to share new content into the experience graph, wherein the links between the specific experience and the corresponding contents are automatically updated, and wherein the new content is accessible by all other users inside the experience graph through the experience graph; and expanding the experience graph over time by automatically examining and extracting necessary attributes related to contextual groups of users inside the experience graph.

\* \* \* \* \*